United States Patent [19]

Vachris

[11] 4,046,028
[45] Sept. 6, 1977

[54] CRANK SHAFT
[76] Inventor: Paul F. Vachris, 57 Chester St., Locust Valley, N.Y. 11560
[21] Appl. No.: 659,607
[22] Filed: Feb. 19, 1976
[51] Int. Cl.² ............................................. F16C 3/12
[52] U.S. Cl. ...................................... 74/597; 74/603; 403/297
[58] Field of Search ...................... 74/597, 598, 603; 403/297

[56] References Cited
U.S. PATENT DOCUMENTS

| 2,100,873 | 11/1937 | Roberts | 403/297 X |
| 2,331,541 | 10/1943 | Dusevoir | 74/598 |
| 2,380,099 | 7/1945 | Dusevoir | 74/598 |
| 2,730,912 | 1/1956 | Marinelli | 74/597 |

FOREIGN PATENT DOCUMENTS

| 747,739 | 4/1933 | France | 74/598 |

Primary Examiner—Allan D. Herrmann
Attorney, Agent, or Firm—Nolte and Nolte

[57] ABSTRACT

A crank shaft particularly for internal combustion engines is made up of separable shaft sections, counterweights and crank pins. The elements of the shaft are joined to each other by dowel or roll pins engaged in aligned holes of the several elements.

7 Claims, 5 Drawing Figures

CRANK SHAFT

BACKGROUND OF THE INVENTION

This invention is concerned with crank shafts, particularly, but not necessarily exclusively, it is concerned with crank shafts for internal combustion engines. A typical crank shaft for an internal combustion engine of an automobile comprises a unitary or integral structure comprising shaft sections at each end of the crank shaft and a center shaft section, those shaft sections being aligned and being supported in the main bearings of the crank case of the engine. The end shaft sections are secured to counterweights, the center-shaft section is formed between two adjacent counterweights and crank pins are formed between adjacent pairs of counterweights, the crank pins having the connecting rods of the pistons mounted upon them when assembled in an engine.

Major problems of the known integral crank shafts are, of course, the fact that if any one of the crank pins or shaft sections become worn, then the whole of the shaft must be replaced. Additionally, of course, there can be no adjustment for stroke with the conventional crank shaft and any adjustment must be effected by replacing the whole crank shaft with a new crank shaft of a different throw.

BRIEF SUMMARY OF THE INVENTION

The present invention seeks to provide a crank shaft obviating these difficulties and providing other and distinct advantages over existing crank shafts. Specifically, the present invention seeks to provide a crank shaft especially suited for use with anti-friction bearings and of which each part can be replaced either for repair or adjustment purposes.

The invention also seeks to provide a crank shaft which can be easily manufactured from stock parts and assembled without special skills.

According to this invention, there is provided a crank shaft of which each of the shaft sections, counterweights and crank pins can be individually separated from the other elements.

DESCRIPTION OF THE PREFERRED EMBODIMENTS

Figure 1:
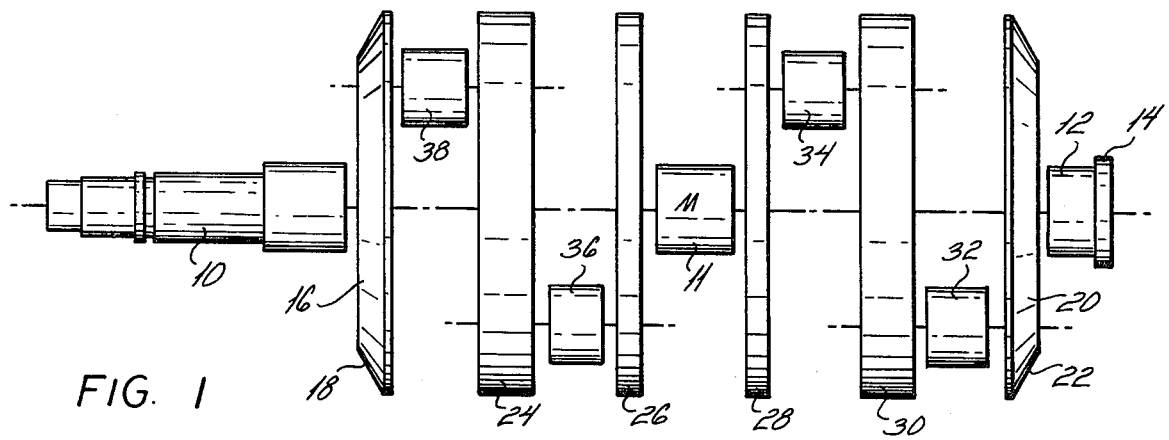
FIG. 1 shows an exploded view of the elements of the crank shaft according to this invention.

The crank shaft of FIG. 1 comprises shaft sections 10, 11 and 12 which are axially aligned to be supported in main bearings of the crank case. In the specific embodiment illustrated, shaft section 12 is adapted to have connected thereto a fly wheel of conventional structure and shaft section 10 is adapted to receive a drive element which is utilized, conventionally, to drive a timing system for the engine within which the crank shaft is to be utilized. Clearly the shaft sections may be modified for other purposes within the purview of this invention.

Adjacent to section 10 is a counterweight 16, the edges 18 of which are relieved to accommodate adjacent elements of the crank case assembly within which the shaft is disposed. Similarly, counterweight 20 is also relieved as at 22 to provide clearance for various elements of the crank case.

The remaining parts of the shaft comprise counterweights 24, 26, 28 and 30 and crank pins 32, 34, 36 and 38; counterweights 26 and 28 supporting main bearing 11 in a manner to be described hereinafter; counterweights 22 and 30 supporting crank pin 32; counterweights 28 and 30 supporting crank pin 34; counterweights 24 and 26 supporting crank pin 36 and counterweights 16 and 24 supporting crank pin 38. The manner of assembling the shaft sections to the various counterweights and the crank pins to the counterweights is described in greater detail hereinafter with respect to FIGS. 2 and 3.

Figure 2:
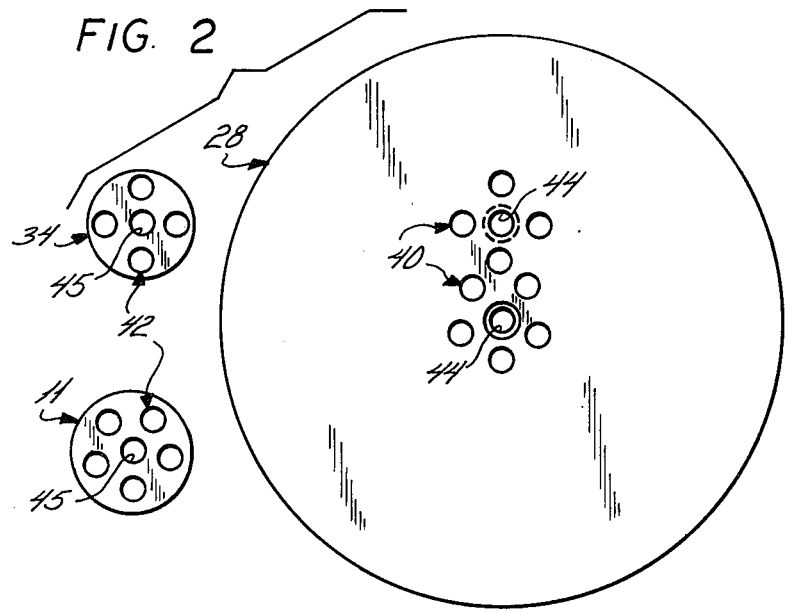
FIG. 2 shows an elevational view of a counterweight according to this invention.
Figure 3:
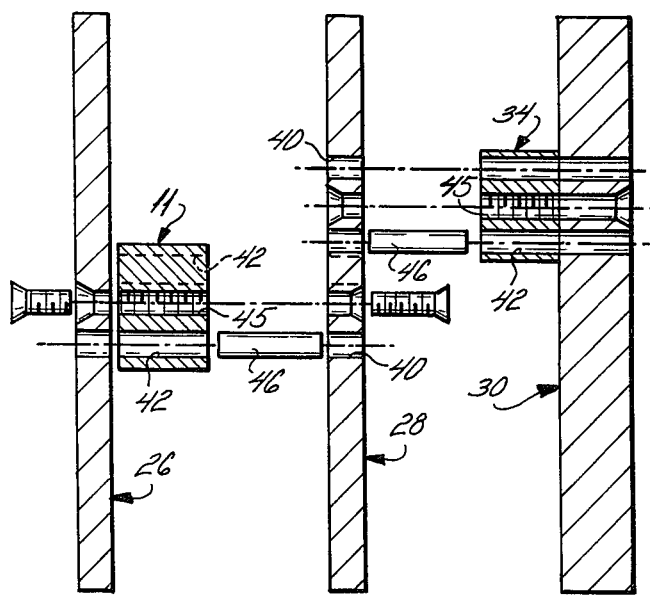
FIG. 3 shows a cross sectional view of two crank pins and a counterweight according to this invention.
Figure 4:
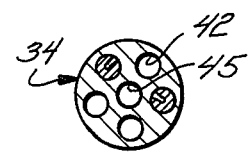
FIGS. 4 and 5 are cross sectional views of different embodiments of the present invention.
Figure 5:
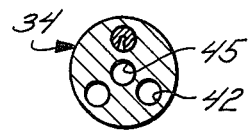

In FIG. 2 there is illustrated a counterweight according to this invention and from the aspect illustrated in FIG. 2 each of the counterweights 16, 20, 24, 26, 28 and 30 are similar with the exception of the disposition of the holes therein. In each of the counterweights at the location where the crank pins are secured to them, there are four holes 40 spaced about a central, countersunk hole 44. Similarly, each of the crank pins and are provided with four correspondingly located holes 42 disposed about central, threaded holes 45. The shaft sections 10, 11 and 12 are provided with five holes 42 and the counterweights with corresponding holes 40. Referring now to FIG. 3, there are provided dowel pins, or roll pins, 46 for disposition within the holes of a crank pin or shaft section so that the end portions of each pin projects to either side of the crank pin or center shaft section or from one side only of the end shaft sections for insertion into the corresponding holes of a counterweight. It will be recognized that where dowel pins are used the holes in the crank pins, shaft sections and counterweights must be reamed to size and the pins and holes are sized to have an interference fit so that there is no risk of their being separated from one another during operation. However, as shown in FIGS. 4 and 5 when roll pins are used which are generally split so as to be compressible to be inserted into holes of lesser diameter than the outside diameter of an uncompressed pin, this problem does not arise and the openings in the crank pins, shaft sections and counterweights need only be drilled, the compressability of the roll pins accommodating any tolerance variations in the holes into which those pins are to be inserted.

With the structure of the present invention, it will be apparent to those skilled in the art that the various elements of the crank shaft may be forged finished so that machining becomes unnecessary. Additionally, it is possible, utilizing anti-friction bearings of the ball or roller or needle types, that the elements of the crank shaft may be of aluminum alloy and that the connecting rods to be secured on the crank pins may be either of the split bearing variety or they may be whole.

In the assembly of the crank shaft illustrated in the drawings, one may simply work from one end to assemble a crank shaft as illustrated, for example, in FIG. 1, or where one is using connecting rods in which the bearings to be supported upon the crank pins are in one piece, one may assemble a shaft section 10 to counterweight 16 and crank pin 38 to counterweight 18 by engaging the dowel or roll pins in the appropriate holes, securing the two parts together by a countersunk head bolt received in the threaded opening of the shaft section thereafter an anti-friction bearing may be disposed upon pin 38 and a whole connecting rod disposed upon the bearing. Thereafter, counterweight 24 would be assembled to pin 38 through the intermediary of appropriate roll or dowel pins and the procedure continued for the remaining parts of the crank shaft. Alternatively and perhaps more desirably, using connecting rods of which the bearings to be mounted upon the crank pins of the shaft are separable, one would assemble the crank shaft and subsequently to the complete assembly of the crank shaft, one would mount the connecting rods to the crank pins.

It will be appreciated from the foregoing description that to replace any part that becomes worn, for example, any one of the bearing support structures, one must merely disassemble the shaft to the extent necessary to replace that particular part. Also, if it becomes desirable as is commonly the case with specialty engines to vary the stroke of the pistons of the engine, one may do this simply by removing the counterweights and replacing them with counterweights of which the array of holes for the reception of the roll or dowel pins are disposed about a center more removed or less removed from the center of the crank shaft.

It is also to be appreciated that while in the illustrated embodiment of FIGS. 1 to 3 there is shown an arrangement of five dowel or roll pins for connecting the shaft sections and counterweights and four such pins for connecting the crank pins and counterweights, quite clearly there may be other arrangements, as for example, one may use three pins disposed at the apices of an equilateral triangle as shown in FIG. 5 or five pins disposed at the corners of a regular pentagon as shown in FIG. 4 for connecting those elements.

What is claimed is:

1. A crank shaft comprising a plurality of counterweights, a plurality of crank pins, two end shaft sections and an intermediate shaft section, said shaft sections being aligned and being receivable in main bearings of a crank shaft housing, each end shaft being removabley secured to an adjacent one of said counterweights, said intermediate shaft section being releasably secured to each of two adjacent counterweights and each crank pin being releasably secured to each of two adjacent counterweights, each of said counterweights, said crank pins and said shaft sections being individually separable from the remaining parts of the crank shaft, each crank pin having a central threaded hole and each counterweight having a hole aligned with said threaded hole whereby screw threaded means inserted through an opening in a counterweight and engaging said screw threaded hole of the crank pin secures to the crank pin and counterweight, each crank pin having a plurality of through holes formed therein parallel to said threaded hole and offset therefrom, said counterweights each having a corresponding plurality of holes registering with said plurality of holes in said crank pin said pluralities of holes constituting means for the reception of pin means, said pin means extending through the crank pins and into said openings of said counterweights.

2. A crank shaft as claimed in claim 1 wherein said pin means comprises dowel pins.

3. A crank shaft as claimed in claim 2 wherein said pin means are dimensioned to be received in said openings with an interference fit.

4. A crank shaft as claimed in claim 1 wherein said pin means comprises axially split pins of which the transverse cross sectional area is reducible for insertion into said corresponding openings.

5. A crank shaft as claimed in claim 1 wherein there are three holes in each plurality of holes and said pin means comprises three pins said holes and pins being disposed at the apices of an equilateral triangle.

6. A crank shaft as claimed in claim 1 wherein there are five holes in each plurality of holes and said pin means comprises five pins, said holes and pins being disposed at a corresponding apex of a regular pentagon.

7. A crank shaft as claimed in claim 1 wherein said pin means comprise a plurality of pins, each pin extending through the crank pin and into the openings of two adjacent counterweights.

* * * * *